United States Patent
Azami

(10) Patent No.: US 6,478,310 B1
(45) Date of Patent: Nov. 12, 2002

(54) COMBINATION PNEUMATIC CHUCK WITH POSITION DETECTING MECHANISM

(75) Inventor: Satoshi Azami, Ibaraki (JP)

(73) Assignee: SMC Corporation, Tokyo (JP)

(*) Notice: Subject to any disclaimer, the term of this patent is extended or adjusted under 35 U.S.C. 154(b) by 133 days.

(21) Appl. No.: 09/664,853

(22) Filed: Sep. 19, 2000

(30) Foreign Application Priority Data

Oct. 4, 1999 (JP) .......................................... 11-282891

(51) Int. Cl.[7] .............................................. B23B 31/30
(52) U.S. Cl. ...................... 279/4.02; 92/5 R; 279/4.12; 279/4.04
(58) Field of Search ............................... 279/4.02, 4.04, 279/4.12, 126; 92/5 R

(56) References Cited

U.S. PATENT DOCUMENTS

| | | | |
|---|---|---|---|
| 4,080,716 A | * 3/1978 | vom Dorp | ................. 279/4.02 |
| 4,443,021 A | * 4/1984 | Buchhholz et al. | ......... 279/4.02 |
| 4,793,241 A | * 12/1988 | Mano et al. | .................. 92/5 R |
| 5,669,283 A | * 9/1997 | Iida et al. | ..................... 92/5 R |

FOREIGN PATENT DOCUMENTS

| | | | |
|---|---|---|---|
| EP | 294547 A1 | * 12/1988 | ................ 279/4.02 |
| EP | WO-94/07037 A1 | * 3/1994 | ................... 92/5 R |
| JP | 8-19983 | 1/1996 | |

\* cited by examiner

*Primary Examiner*—Steven C. Bishop
(74) *Attorney, Agent, or Firm*—Oblon, Spivak, McClelland, Maier & Neustadt, P.C.

(57) ABSTRACT

A stroke first air cylinder mechanism having a larger-diameter first piston and a larger-diameter first rod is incorporated in a casing, a chuck second air cylinder mechanism having a smaller-diameter second piston and a smaller-diameter second piston and a smaller-diameter second rod is coaxially incorporated into the first air cylinder mechanism, a base end portion of the second rod projects from the first piston and extends to such a position as to face a position detecting portion of the casing, a magnet is mounted to the base end portion of the second rod, and magnetometric sensor is mounted to the position detecting portion. By detecting an operating position of the second rod, opening and closing positions of jaw members can be detected.

8 Claims, 5 Drawing Sheets

COMBINATION PNEUMATIC CHUCK WITH POSITION DETECTING MECHANISM

TECHNICAL FIELD

The present invention relates to a combination pneumatic chuck having a position detecting mechanism for detecting a chuck position of a workpiece by jaw members.

PRIOR ART

There is a known combination pneumatic chuck having a chuck function of chucking a workpiece and a stroke function of moving the chucked workpiece forward and rearward as disclosed in Japanese Patent Application Laid-open No. 8-19983, for example. In this pneumatic chuck, a stroke air cylinder mechanism formed of a larger-diameter piston and a larger-diameter rod and a chuck air cylinder mechanism formed of a smaller-diameter piston and a smaller-diameter rod are coaxially incorporated in a double layers in inner and outer positions in a casing, a chuck head is mounted to the rod of the stroke air cylinder mechanism, a plurality of jaw members for grasping the workpiece are mounted to the chuck head such that the jaw members can be opened and closed, and the jaw members are opened and closed by the rod of the chuck air cylinder mechanism.

To such a pneumatic chuck, in general, a position detecting mechanism formed of a magnet and a magnetometric sensor is attached so as to detect chucking or releasing of the workpiece by the jaw members and to produce control signals for automatic operation. Specifically, magnets are mounted to the jaw members and a sensor is mounted to the casing to directly detect operating positions of the jaw members. Otherwise, a magnet is mounted to the piston of the chuck air cylinder mechanism to detect an operating position of the piston, thereby indirectly detecting opening and closing positions of the jaw members.

However, because the chuck head for retaining the jaw members is driven by the stroke air cylinder mechanism in the above prior-art combination pneumatic chuck, it is difficult to directly detect the operating positions of the jaw members by mounting the sensor to the chuck head that is displaced. Because the piston and the rod of the chuck air cylinder mechanism are incorporated into the piston and the rod of the stroke air cylinder mechanism such that the stroke air cylinder mechanism exists between the chuck air cylinder mechanism and the casing, it is also difficult to detect the position of the piston of the chuck air cylinder mechanism.

SUMMARY OF THE INVENTION

It is a technical object of the present invention to provide a combination pneumatic chuck with a chuck air cylinder mechanism and a stroke air cylinder mechanism coaxially incorporated in inner and outer positions in the casing, wherein chuck operation of a workpiece by jaw members can be detected reliably by a simple structure.

To achieve the above object, a combination pneumatic chuck according to the invention comprises: a casing having therein a cylinder bore; a stroke first air cylinder mechanism including a larger-diameter first piston housed for sliding in the cylinder bore in the casing and a larger-diameter first rod having a base end portion connected to the first piston and a tip end portion extending from of the casing; a chuck second air cylinder mechanism including a smaller-diameter second piston housed for sliding coaxially in the first piston and a smaller-diameter second rod having a tip end portion connected to the second piston and extending to an inside of the first rod and a base end portion extending to such a position as to project from the first piston and to face a position detecting portion of the casing; a chuck head mounted to the tip end of the first rod for moving forward and rearward in response to expansion and contraction of the first rod; a plurality of jaw members for grasping a workpiece and mounted for opening and closing to the chuck head; a converting mechanism disposed between the jaw members and the second rod in the chuck head for converting expanding and contracting operations of the second rod into opening and closing operations of the jaw members; and chuck position detecting means which is for detecting opening and closing positions of the jaw members and which includes a detected member mounted to the base end portion of the second rod and a position sensor mounted to a position detecting portion of the casing for detecting the detected member.

According to the combination pneumatic chuck of the invention having the above structure, by a simple structure in which: the base end portion of the second rod of the second air cylinder mechanism projects from the first piston of the second air cylinder mechanism and extends to such a position as to face the position detecting portion of the casing; the detected member is mounted to the base end portion; and the position sensor is mounted to the position detecting portion of the casing, the opening and closing positions of the jaw members can be indirectly detected by detecting the operating position of the rod of the first air cylinder mechanism even in the structure in which the first air cylinder mechanism is incorporated into the second air cylinder mechanism without extensively modifying the structure.

According to a concrete embodiment of the invention, the position detecting portion is in a small cylindrical shape of such a size that the base end portion of the second rod is fitted into the position detecting portion and is formed to project outward along an axis at a central portion of the base end face of the casing, at least one sensor mounting groove is formed in an outer face of the position detecting portion, and the position sensor is mounted in the sensor mounting groove.

According to another concrete embodiment of the invention, the pneumatic chuck includes stroke position detecting means which is for detecting a stroke position of the chuck head and which has a detected member mounted to the first piston and a position sensor mounted to the casing for detecting the detected member.

According to a preferred embodiment of the invention, the pneumatic chuck includes a pair of stroke ports for supplying compressed air to pressure chambers on opposite sides of the first piston and a pair of chuck ports for supplying compressed air to pressure chambers on opposite sides of the second piston and the ports are concentrated on the base end face of the casing.

DESCRIPTION OF THE PREFERRED EMBODIMENTS

A preferred representative embodiment of a combination pneumatic chuck with a position detecting mechanism according to the present invention will be described below in detail by reference to the drawings.

Figure 1:
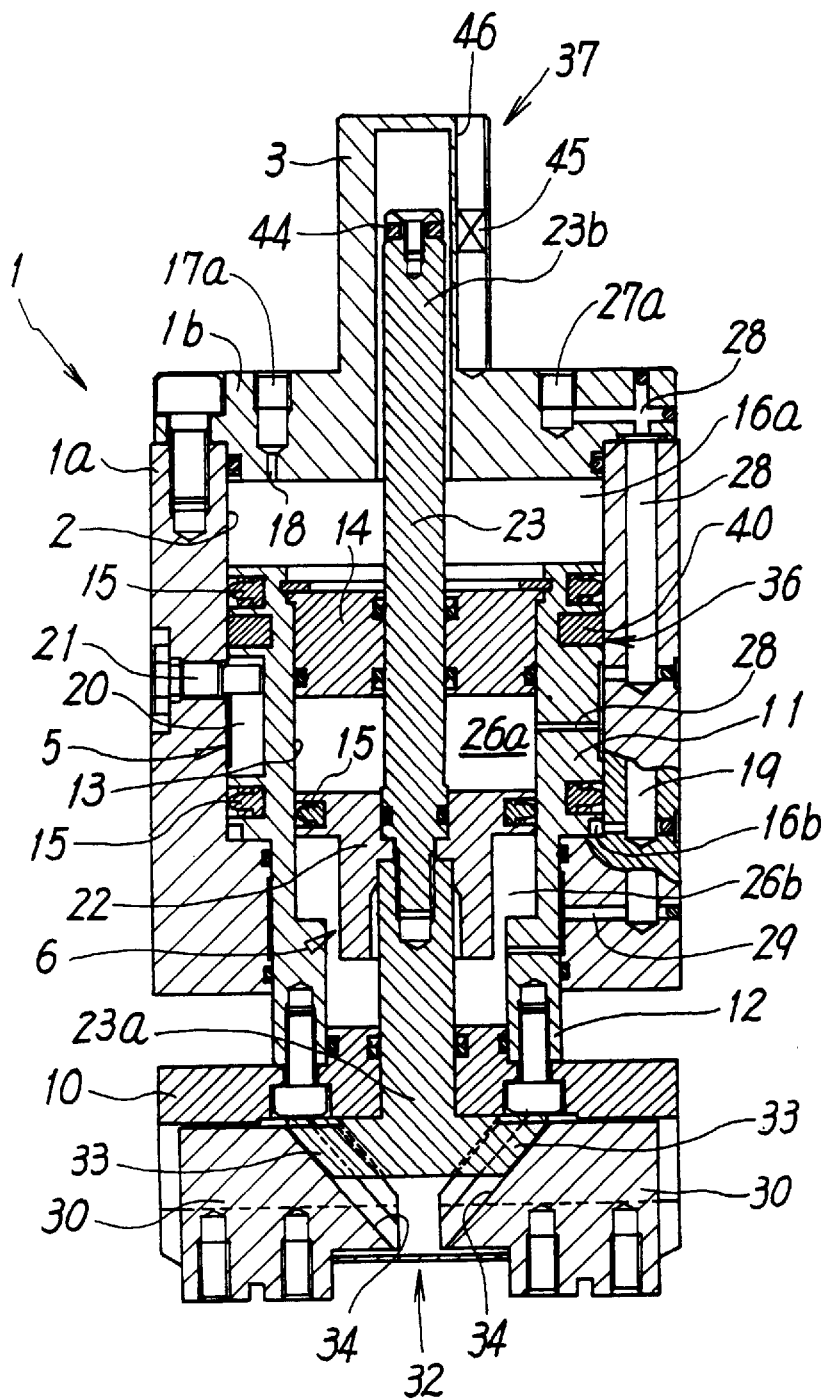
FIG. 1 is a vertical sectional view showing an embodiment of a combination pneumatic chuck according to the present invention.
Figure 2:
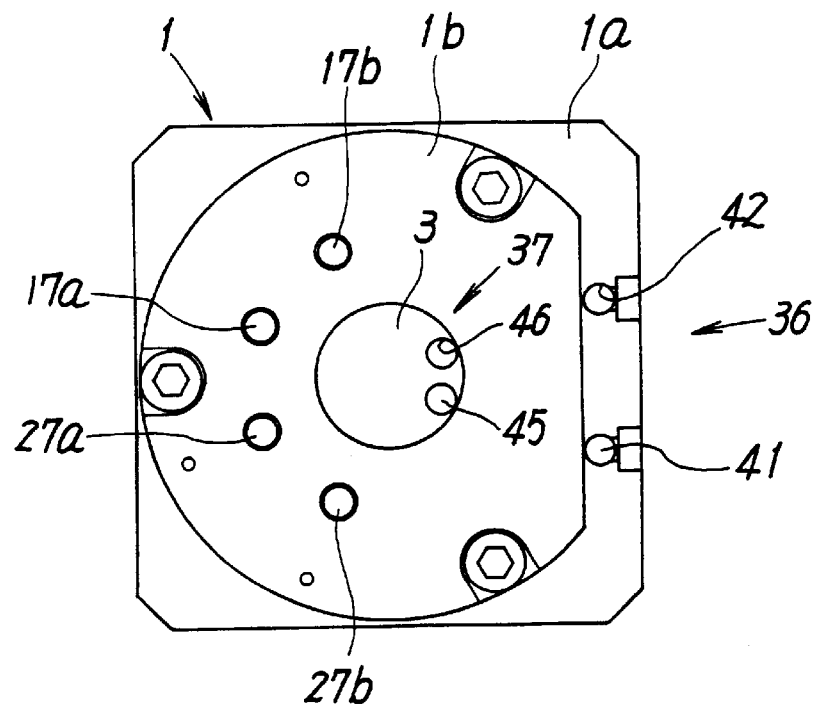
FIG. 2 is a plan view of FIG. 1.
Figure 3:
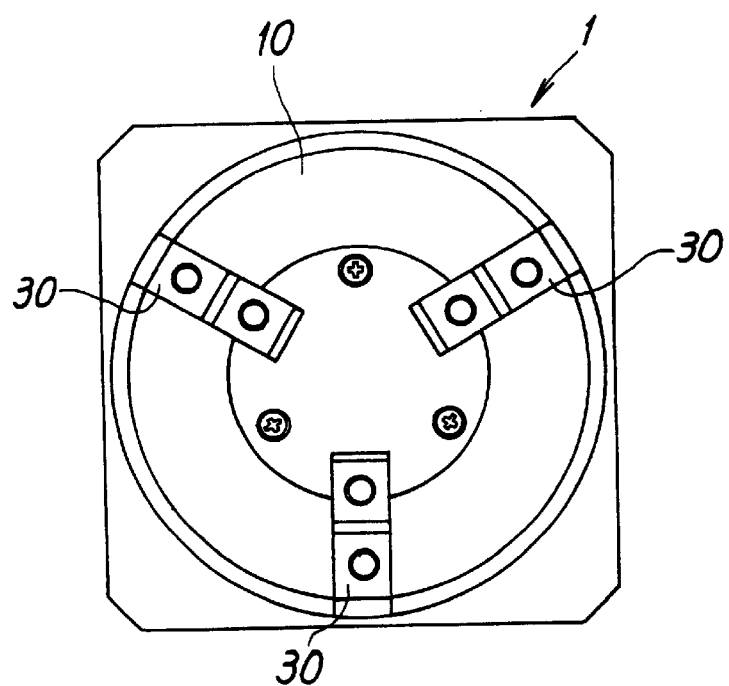
FIG. 3 is a bottom view of FIG. 1.

In FIGS. 1 to 3, a reference numeral 1 designates a casing and the casing 1 is formed of a first portion 1a in a prism shape having therein a cylinder bore 2 and a second portion 1b having a shape formed by linearly cutting off one side portion of a disc and mounted to one end of the first portion 1a to close the cylinder bore 2. A position detecting portion 3 in a small cylindrical shape is formed to project outward from a central portion of the disc on an outer end face of the second portion 1b.

Inside the casing 1, a larger-diameter first air cylinder mechanism 5 and a smaller-diameter second air cylinder mechanism 6 are incorporated coaxially in inner and outer positions.

The first air cylinder mechanism 5 is a stroke air cylinder mechanism for moving a chuck head 10 forward and rearward and includes a larger-diameter first piston 11 housed for sliding in the cylinder bore 2 and a larger-diameter first rod 12 having a base end portion connected to the first piston 11 and a tip end portion airtightly projecting for sliding from the cylinder bore 2. The first piston 11 has a slightly long cylindrical shape and includes a cylinder bore 13 formed in the first piston 11 and a cover 14 for closing one end of the cylinder bore 13. Two pieces of packing 15 are mounted to an outer periphery of the first piston 11 at necessary intervals and a pair of pressure chambers 16a and 16b are separated by these pieces of packing 15 on opposite sides of the first piston 11.

Stroke ports 17a and 17b for supplying compressed air to the respective pressure chambers 16a and 16b are formed in an upper face of the casing 1 as can be seen from FIG. 2. One port 17a communicates with the head-side pressure chamber 16a through a through hole 18 and the other port 17b communicates with the rod-side pressure chamber 16b through a through hole 19.

A locking groove 20 that is long in an axial direction of the first piston 11 is formed at a portion of the outer peripheral face of the first piston 11 and a locking member 21 having a tip end to be locked into the locking groove 20 is screwed onto the casing 1. A detent for preventing rotation of the first piston 11 is formed of the locking groove 20 and the locking member 21. On the other hand, the second air cylinder mechanism 6 is a chuck air cylinder mechanism for chucking and releasing a workpiece and includes a smaller-diameter second piston 22 housed for sliding in the cylinder bore 13 in the first piston 11 and a smaller-diameter second rod 23 mounted fixedly to a central portion of the second piston 22 and extending in opposite directions from the second piston 22. A piece of packing 15 is mounted to an outer periphery of the second piston 22 and a pair of pressure chambers 26a and 26b are separated by the piece of packing 15 on opposite sides of the second piston 22. A tip end portion 23a of the second rod 23 extends to pass through the first rod 12 and a base end portion 23b of the second rod 23 airtightly passes for sliding through the cover 14 of the first piston 11 and extends to such a position as to be fitted in the position detecting portion 3 formed in the second portion 1b of the casing 1.

Chuck ports 27a and 27b for supplying compressed air to the respective pressure chambers 26a and 26b are formed in the upper face of the casing 1 as shown in FIG. 2. One port 27a communicates with the head-side pressure chamber 26a through a through hole 28 and the other port 27b communicates with the rod-side pressure chamber 26b through a through hole 29.

Thus, by concentrating the stroke ports 17a, 17b and the chuck ports 27a, 27b for supplying compressed air to the two air cylinder mechanisms 5 and 6 on the upper face of the casing 1, air piping for the respective ports can be gathered in only one direction. Therefore, piping operation and maintenance are facilitated.

The chuck head 10 in a short columnar shape is mounted to a tip end of the first rod 12 of the first air cylinder mechanism 5 and the chuck head 10 moves forward and rearward in response to expansion and contraction of the first rod 12. To the chuck head 10, a plurality of jaw members 30, 30 for grasping the workpiece are mounted such that the jaw members 30, 30 can be opened and closed by being displaced radially from an axis of the second rod 23 as a center and a converting mechanism 32 for converting expanding and contracting operation of the second rod 23 to opening and closing operations of the jaw members 30, 30 is provided.

The converting mechanism 32 is of a cam type and is formed of a plurality of cams 33 formed at the tip end portion of the second rod 23 to correspond to the respective jaw members 30, 30 and cam grooves 34 formed in inner ends of the respective jaw members 30, 30. The cams 33 are inclined in such directions that tip end sides of the cams 33 gradually approach the center of the rod 23, the cam grooves 34 are inclined in the same directions as the cams 33, and each cam 33 and each cam groove 34 corresponding to each other are respectively engaged with each other for sliding. When the second rod 23 expands, the respective cams 33 slide on inclined faces of the cam grooves 34 to push the jaw members 30, 30 outward, thereby increasing a gap between the respective jaw members 30, 30. When the second rod 23 contracts, the respective cams 33 draw the jaw members 30, 30 inward to decrease the gap. At this time by jigs mounted to the respective jaw members 30, 30, the workpiece is chucked or released.

To the pneumatic chuck, stroke position detecting means 36 for detecting a stroke position of the chuck head 10 when the first air cylinder mechanism 5 operates and chuck position detecting means 37 for detecting opening and closing positions of the jaw members 30, 30 when the first air cylinder mechanism 5 operates are attached.

The stroke position detecting means 36 includes a detected member 40 formed of a magnet mounted to the outer periphery of the first piston 11 and a position sensor 41 mounted in a sensor mounting groove 42 in an outer face of the casing 1 for detecting magnetism from the detected member 40. In order to detect positions of the chuck head 10 at opposite stroke ends, each the position sensor 41 may be provided to a position corresponding to each of the opposite stroke ends in the two mounting grooves 40, 40. In order to detect any one of the stroke ends, the one position sensor 41 may be provided at a position corresponding to the stroke end. Otherwise, it is also possible that only one position sensor that can detect magnetism throughout the stroke of the chuck head 10 is provided to detect every position in the stroke based on variations of the magnetism.

On the other hand, the chuck position detecting means 37 includes a detected member 44 formed of a magnet mounted to an end face of the base end portion of the second rod 23 and position sensors 45 mounted in sensor mounting grooves 46 formed in an outer face of the position detecting portion 3 of the casing 1 for detecting magnetism from the detected member 44. Positions, the numbers, and the like of the position sensors 45 in this case are the same as those of the stroke position detecting means 36.

The respective position detecting means 36 and 37 are not limited to the above-described means according to a magnetism detecting method and formed of the magnets and the magnetic sensors. Position detecting means according to another detecting method such as detecting for variation of capacitance and detecting for variation of impedance or an optical method may be also employed.

In the combination pneumatic chuck having the above structure, the first piston 11 and the first rod 12 can be caused to operate to move the chuck head 10 forward and rearward by supplying compressed air alternately to the two pressure chambers 16a and 16b of the first air cylinder mechanism 5 from the pair of stroke ports 17a and 17b formed in the upper face of the casing 1 and the second piston 22 and the second rod 23 can be caused to operate to open and close the plurality of jaw members 30, 30 on the chuck head 10 by supplying compressed air alternately to the two pressure chambers 26a and 26b of the second air cylinder mechanism 6 from the pair of chuck ports 27a and 27b. By combining these operations, it is possible to carry out operations such as chucking the workpiece by the jaw members 30, 30 and lifting the workpiece or lowering and releasing the chucked workpiece.

Figure 4:
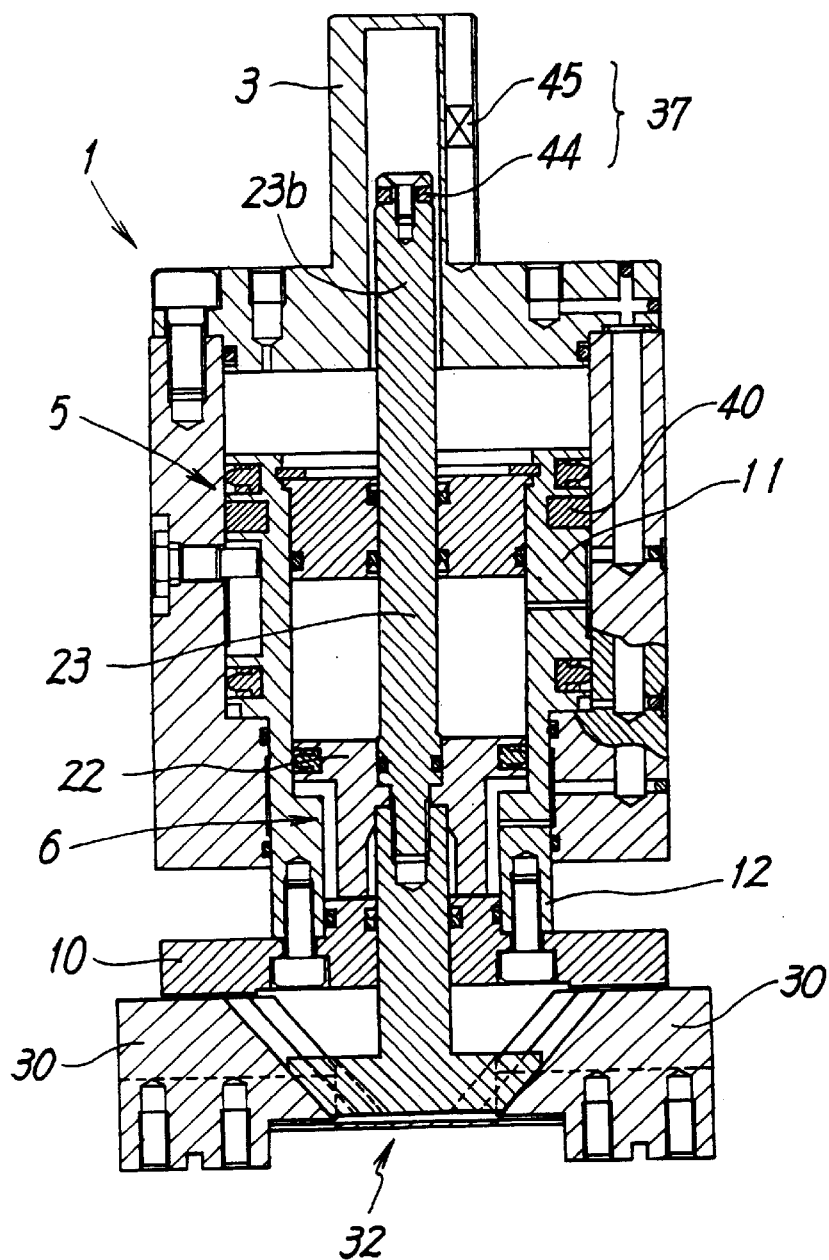
FIG. 4 is a vertical sectional view showing a different operating state of the pneumatic chuck.
Figure 5:
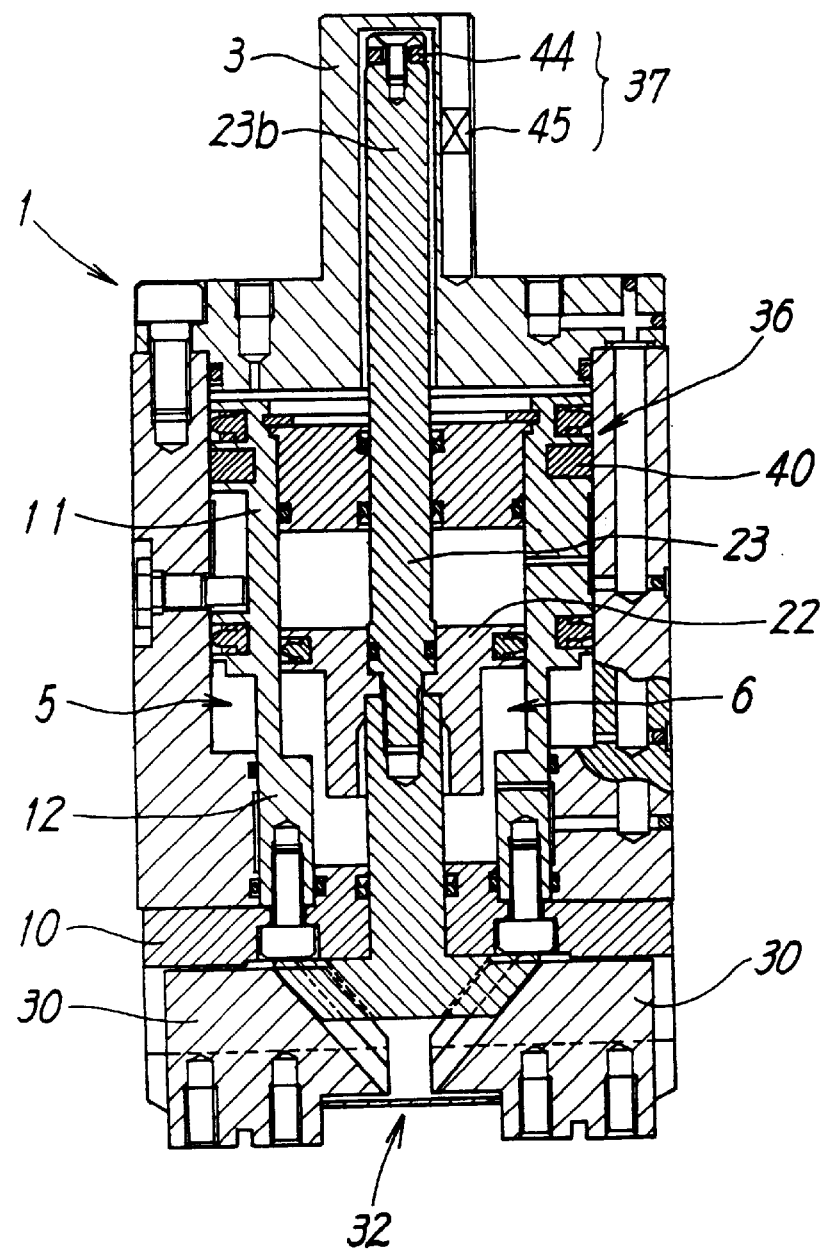
FIG. 5 is a vertical sectional view showing a further different operating state of the pneumatic chuck.
Figure 6:
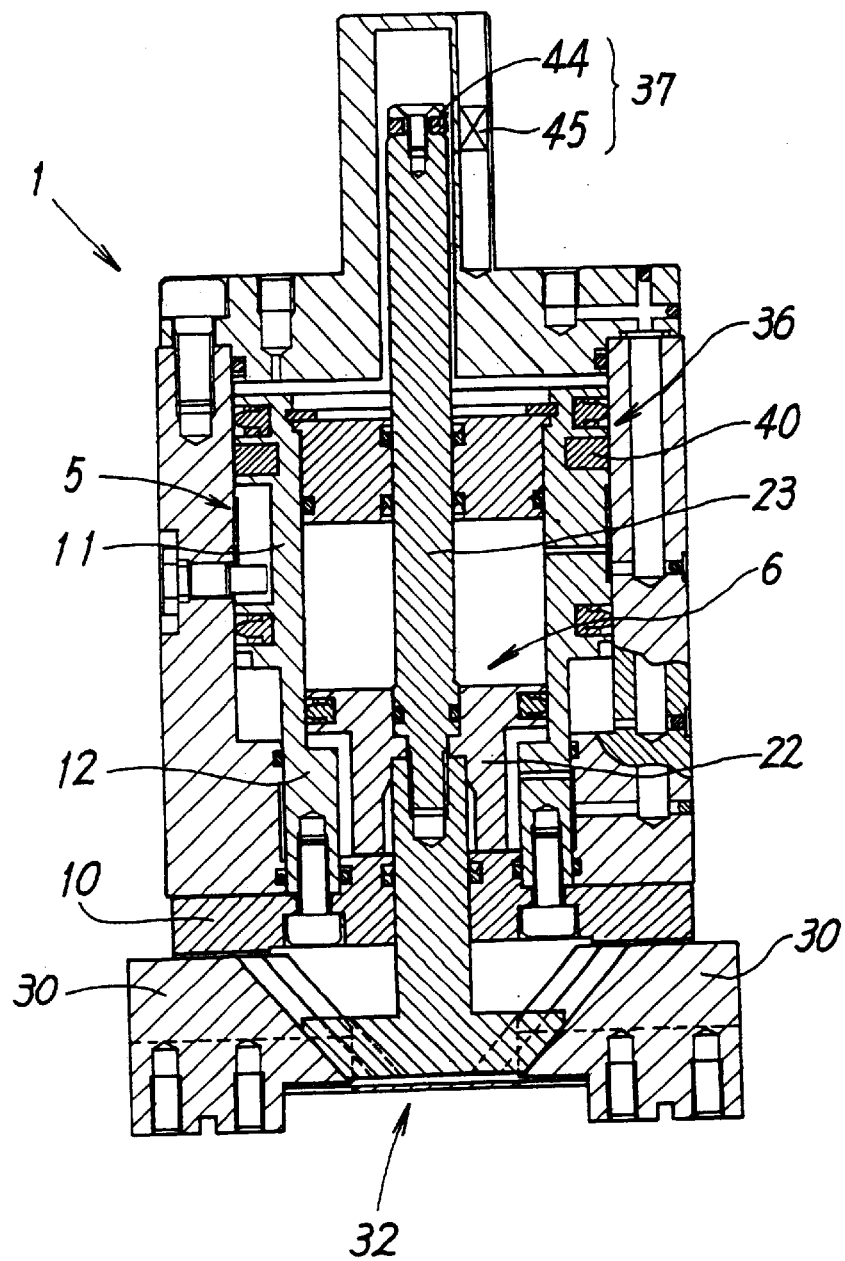
FIG. 6 is a vertical sectional view showing a further different operating state of the pneumatic chuck.

To specifically show the above operations, FIG. 1 shows a case in which the first rod 12 of the first air cylinder mechanism 5 is expanded to move the chuck head 10 forward and the second rod 23 of the second air cylinder mechanism 6 is moved rearward to close the jaw members 30, 30. FIG. 4 shows a case in which the first rod 12 of the first air cylinder mechanism 5 is expanded to move the chuck head 10 forward and the second rod 23 of the second air cylinder mechanism 6 is moved forward to open the jaw members 30, 30. Furthermore, FIG. 5 shows a case in which the first rod 12 of the first air cylinder mechanism 5 is contracted to move the chuck head 10 rearward and the second rod 23 of the second air cylinder mechanism 6 is moved forward to open the jaw members 30, 30. FIG. 6 shows a case in which the first rod 12 of the first air cylinder mechanism 5 is contracted to move the chuck head 10 rearward and the second rod 23 of the second air cylinder mechanism 6 is moved rearward to close the jaw members 30, 30.

Position detection when the chuck head 10 moves forward or rearward to reach the stroke end is carried out by detecting the operating position of the first piston 11 by the stroke position detecting means 36.

On the other hand, position detection when the jaw members 30, 30 are opened or closed is carried out indirectly by detecting the operating position of the second rod 23 by the chuck position detecting means 37. In this case, because the second rod 23 moves forward and rearward with the first piston 11 of the first air cylinder mechanism 5 when the first piston 11 moves forward and rearward, the position of the second rod 23 at the forward stroke end and the position of the second rod 23 at the rearward stroke end change depending on the state in which the first piston 11 has moved forward or rearward as can be seen from FIGS. 1 and 4 to 6. Therefore, in order to detect the operating positions of the second rod 23 shown in FIGS. 1 and 4, the position sensors 45 are respectively mounted to portions corresponding to the operating positions in the two sensor mounting grooves 46, 46 formed in the position detecting portion 3, it is detected that the compressed air has been supplied to the respective pressure chambers 16a and 16b of the first air cylinder mechanism 5, and a supply signal is associated with a position signal from the position sensors 45, thereby detecting the operating positions of the second rod 23.

As described above, according to the invention, even in the combination pneumatic chuck in which the chuck air cylinder mechanism and the stroke air cylinder mechanism are coaxially incorporated in the inner and outer positions in the casing, it is possible to reliably detect the chuck operation of the workpiece by the jaw members by the simple structure for which the rod of the chuck air cylinder mechanism is used.

What is claimed is:

1. A combination pneumatic chuck with a position detecting mechanism, comprsing:

a casing having therein a cylinder bore;

a stroke first air cylinder mechanism including a larger-diameter first piston housed for sliding in said cylinder bore in said casing and a larger-diameter first rod having a base end portion connected to said first piston and a tip end portion projecting outside from a tip end face of said casing;

a chuck second air cylinder mechanism including a smaller-diameter second piston housed for sliding coaxially in said first piston and a smaller-diameter second rod having a tip end portion connected to said second piston and extending to an inside of said first rod and a base end portion extending to such a position as to project from said first piston and to face a position detecting portion of said casing;

a chuck head mounted to said tip end of said first rod for moving forward and rearward in response to expansion and contraction of said first rods;

a plurality of jaw members for grasping a workpiece and mounted for opening and closing to said chuck head;

a converting mechanism disposed between said jaw members and said second rod in said chuck head for converting expanding and contracting operations of said second rod into opening and closing operations of said jaw members; and a chuck position detecting mechanism for detecting opening and closing positions of said jaw members and which includes a detected member mounted to said base end portion of said second rod and a position sensor mounted to a position detecting portion of said casing for detecting said detected member.

2. A pneumatic chuck according to claim 1, wherein said position detecting portion comprises a small cylindrical shaped member of such a size that said base end portion of said second rod is fitted into said position detecting portion and is formed to project outward along an axis at a central portion of said base end face of said casing, at least one sensor mounting groove is formed in an outer face of said position detecting portion, and said position sensor is mounted in said sensor mounting groove.

3. A pneumatic chuck according to claim 1, wherein said pneumatic chuck includes a stroke position detecting mechanism for detecting a stroke position of said chuck head and which has a detected member mounted to said first piston and a position sensor mounted to said casing for detecting said detected member.

4. A pneumatic chuck according to claim 2, wherein said pneumatic chuck includes stroke position detecting means which is for detecting a stroke position of said chuck head and which has a detected member mounted to said first piston and a position sensor mounted to said casing for detecting said detected member.

5. A pneumatic chuck according to claim 1, wherein said pneumatic chuck includes a pair of stroke ports for supplying compressed air to pressure chambers on opposite sides of said first piston and a pair of chuck ports for supplying compressed air to pressure chambers on opposite sides of said second piston and said ports are concentrated on said base end face of said casing.

6. A pneumatic chuck according to claim 2, wherein said pneumatic chuck includes a pair of stroke ports for supplying compressed air to pressure chambers on opposite sides of said first piston and a pair of chuck ports for supplying compressed air to pressure chambers on opposite sides of said second piston and said ports are concentrated on positions adjacent to said position detecting portion of said base end face of said casing.

7. A pneumatic chuck according to claim 3, wherein said pneumatic chuck includes a pair of stroke ports for supplying compressed air to pressure chambers on opposite sides of said first piston and a pair of chuck ports for supplying compressed air to pressure chambers on opposite sides of said second piston and said ports are concentrated on said base end face of said casing.

8. A pneumatic chuck according to claim 2, wherein said pneumatic chuck includes a stroke position detecting mechanism for detecting a stroke position of said chuck head and which has a detected member mounted to said first piston and a position sensor mounted to said casing for detecting said detected member.

* * * * *